Sept. 24, 1929.  J. H. SPARSHATT  1,729,555
COVER OR TILT FOR ROAD TRANSPORT VEHICLES
Filed March 8, 1928  3 Sheets-Sheet 1

INVENTOR:
John Herbert Sparshatt
by Ernest Wilkinson
ATTORNEY

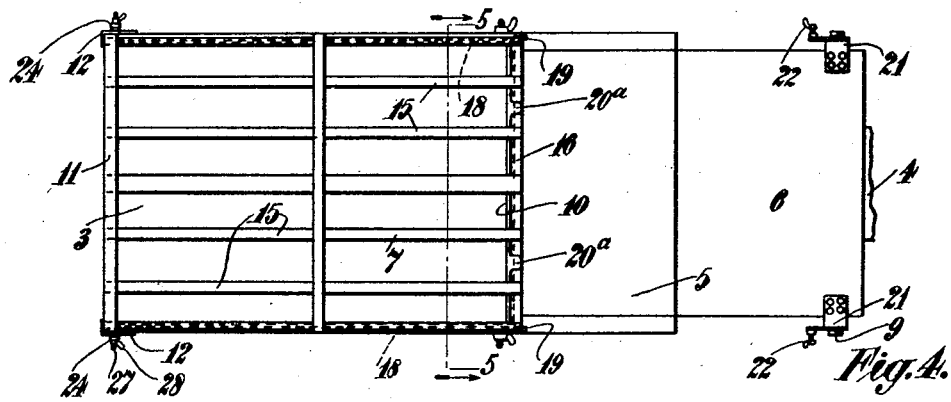
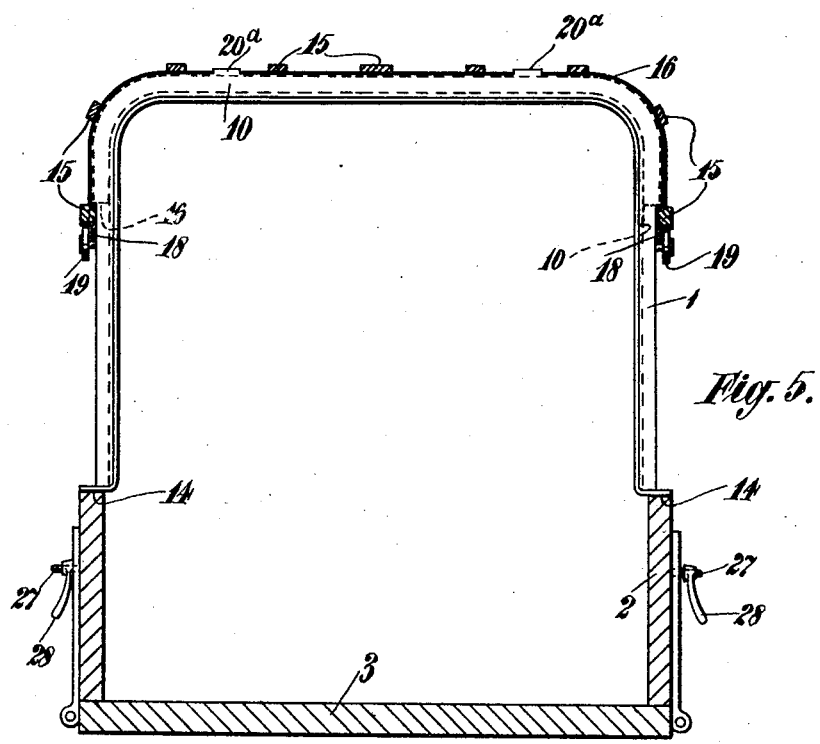
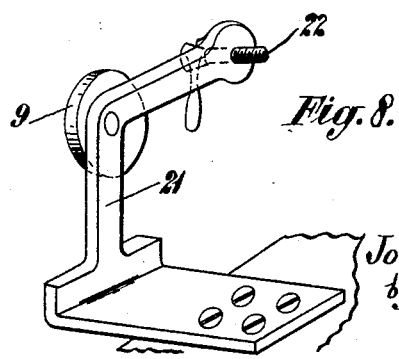

Sept. 24, 1929.  J. H. SPARSHATT  1,729,555
COVER OR TILT FOR ROAD TRANSPORT VEHICLES
Filed March 8, 1928  3 Sheets-Sheet 3

Inventor
John Herbert Sparshatt
by Ernest Wilkinson
Attorney.

Patented Sept. 24, 1929

1,729,555

UNITED STATES PATENT OFFICE

JOHN HERBERT SPARSHATT, OF PORTSMOUTH, ENGLAND

COVER OR TILT FOR ROAD TRANSPORT VEHICLES

Application filed March 8, 1928, Serial No. 260,102, and in Great Britain November 1, 1927.

The present invention is an improvement in or a modification of the invention relating to sliding covers or tilts for road transport vehicles forming the subject of my U. S. Patent No. 1,681,062, granted August 14, 1928, and entitled Cover for vehicles.

The present invention relates to what is known as a slack sheet van, and is intended to provide a vehicle which may be optionally used either with an exposed flat loading platform, or as a covered van.

Figure 1:
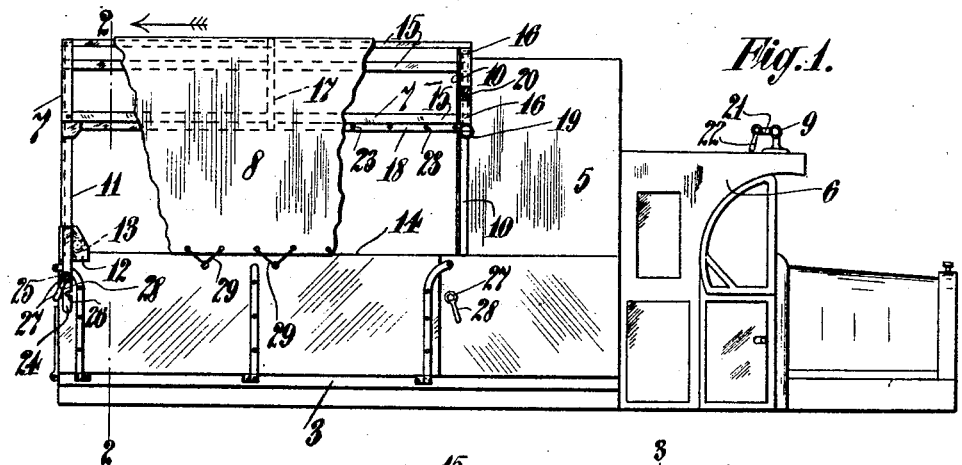
Figure 2:
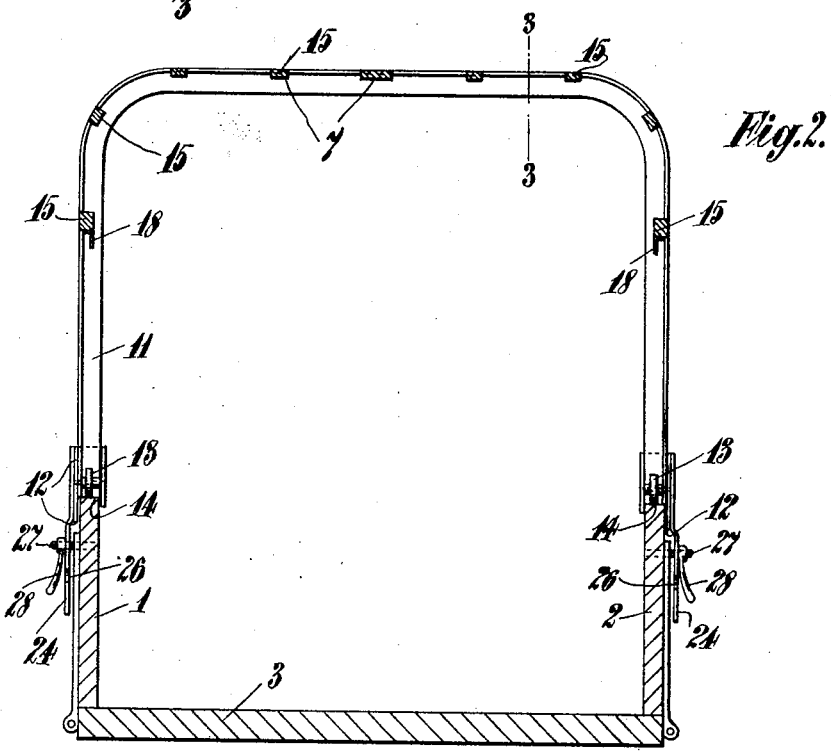
Figure 3:
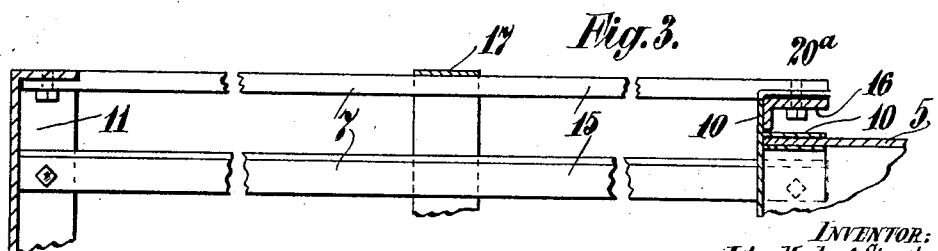
Figure 6:
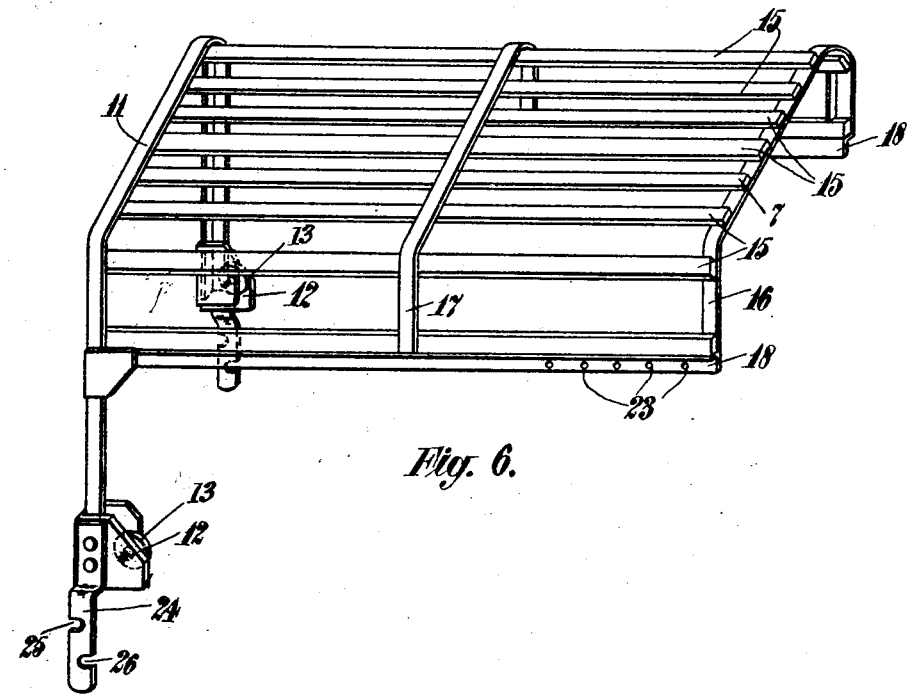
Figure 7:
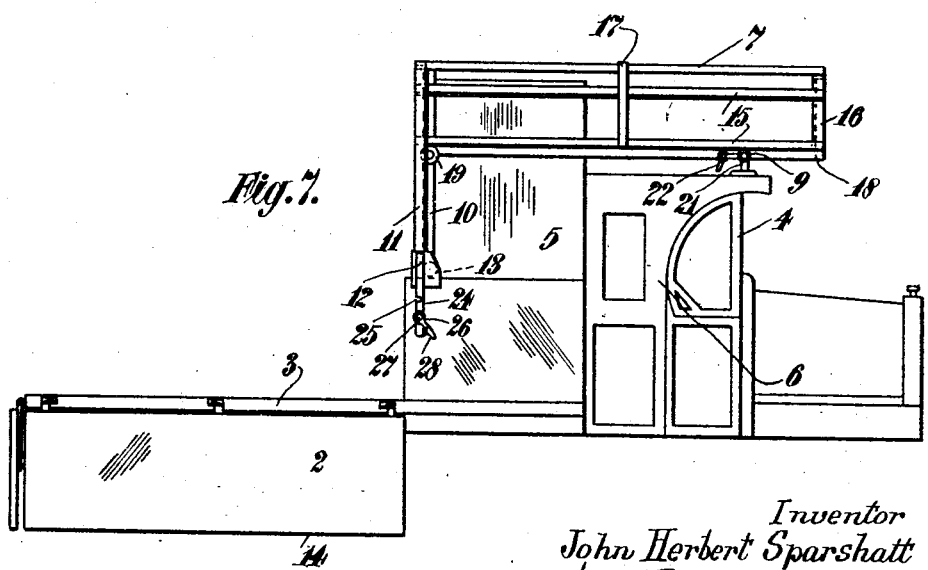

My invention will be more fully understood after reference to the accompanying drawings, in which like parts are indicated by similar reference symbols throughout the several views, and in which Figure 1 is a side elevation showing the slack sheet or flexible covering broken away to more clearly show the skeleton frame therefor, Figure 2 is a sectional view on a larger scale than Fig. 1, and taken on the line 2—2 thereof, Figure 3 is a sectional detail view along the line 3—3 of Figure 2, Figure 4 is a plan view of Figure 1, with the flexible cover removed, Figure 5 is a sectional view similar to Figure 2, but taken along the line 5—5 of Figure 4, looking in the direction of arrows, Figure 6 is a perspective view of the skeleton frame removed from the vehicle, Figure 7 is a view similar to Figure 1, but shows the skeleton frame in the forward position and the hinged drop sides and tail board lowered, and Figure 8 is a detail view of the side guides for the forward lower edge of the sliding skeleton frame.

1, 2 are supports upstanding from the floor 3 of the vehicle body 4, these supports being in the example shown the drop sides of the vehicle; and 10 is a support at or adjacent the rear of the cab 6 of a motor vehicle, being in the example shown at the rear of the fixed front portion 5.

7 is a skeleton frame adapted to receive a slack sheet 8, and when slid forward to move on to rollers 9, or equivalent antifriction bearings mounted on the roof of the cab 6.

The drop sides 1 and 2, when upstanding, are comparable to the deck rails of ships, and hence are not to be regarded as in the nature of superstructure.

Adjustable locking means may be provided for retaining the sliding frame in its closed position or in various partly or fully opened positions.

Behind the fixed parts 5 of the vehicle body, I provide an angle iron bow 10 which may be suitably boarded or otherwise covered in; and the sliding frame is provided at its rear end with an angle iron bow 11, which is made with a somewhat larger crown portion than the fixed bow 10, this bow 11 being located at the rear of the vehicle when the cover is over the load platform of the vehicle.

The lower ends of this rear bow 11 are provided with bifurcated feet 12, in which anti-friction bearings 13 are mounted to run on the tops 14 of the low sides 1 and 2 of the vehicle, as shown in Figures 2 and 6.

In spaced relation round the crown portion of the rear bow 11 are fixed longitudinal bars 15 which at their other ends are secured to a short front bow 16, which is located in front of the bow 10. This bow 16 has substantially shorter downwardly projecting legs than the rear bow 11.

Intermediate of their ends, the longitudinal bars may be attached to one or more additional transverse bows 17, similar to the short bow 16.

The rear bow 11 being larger than the front bow 10 allows the group of longitudinal bars 15 to clear the fixed bow 10 of the vehicle, and so move with the front bow 16 and trail the rear bow 11 behind them.

The parallel lowermost bars of the longitudinal group 15 have tracks, which may be angle irons 18 fixed thereto for running on antifriction bearings 19, mounted on the fixed bow 10. When the sliding frame is over the loading platform, the front bow 16 acts as a headstop in making contact with the front of the fixed bow 10, and there may be steady pins 20, or stops 20ª, or equivalent means to interlock the front bow 16 and the fixed bow 10 to hold the sliding frame in the desired position.

Side guides 21, see Figure 8, may be provided on the cab 6. These side guides 21 may be provided with a locking device, such as a screw bolt 22, for registering with a series of holes 23 in the angle iron runners 18 of the longitudinal bars 15, so as to lock the sliding frame in the open or partly open position.

Plates or bars 24 depending from the feet 12 of the rear bow 11 as shown in Fig. 6, may be provided for locking the rear of the sliding frame in the closed, or open, or partly open position. These plates or bars 24 may be slotted in opposite directions at 25, 26 to slide into engagement with screw bolts 27 on the vehicle corresponding to the open and closed positions of the cover respectively, fly or lever nuts 28 being provided to cooperate with the screw bolts 27 for retaining the cover in the desired position.

The aforesaid skeleton frame serves to carry the slack sheet 8 which may be fastened down by draw strings at the front and rear, and lashed down by cords or the like 29 along the sides of the vehicle onto rows of hooks, or in any other convenient way.

If it is desired to carry a high top load, the sliding frame may be locked in the desired forward position and the slack sheet released and rolled up clear, or substantially clear, of the cab of the vehicle.

It will be seen that I provide a substantially L shaped sliding skeleton frame of light yet sufficiently stiff construction, having a track at each lower edge adapted to slide freely on antifriction bearings carried by the forward portion of the vehicle body, and to be supported entirely in said bearings when said frame is in the forward position, while the said frame carries two downwardly projecting legs at its rear carrying antifriction bearings adapted to slide freely over the drop sides of the vehicle, and to support the rear end of the cover when it is drawn wholly or partly over the loading platform, with means for locking said sliding frame in any desired position.

The parts of the skeleton frame may be detachably secured together in any convenient way, so that if and when desired, the parts of the frame may be disassembled and compactly stowed away, for example in a chamber of the vehicle.

I claim as my invention:

The combination with a vehicle body provided with a raised fixed forward covered portion, and a low lying rearwardly extending load platform with hinged low sides, of a sliding frame mounted on said vehicle body, comprising a rear bow having downwardly projecting legs, provided with antifriction bearings, adapted to engage the tops of said low sides, a front bow, having shorter legs than the rear bow and substantially horizontal longitudinal bars fixed to said bows, and extending therebetween to form a substantially rigid L-shaped frame, and additional antifriction bearings for said frame located on each side of the raised fixed portion of the vehicle body forwardly of said platform, and adapted to engage oppositely disposed horizontal bars of the sliding frame.

In testimony whereof I affix my signature.

JOHN HERBERT SPARSHATT.